United States Patent
Lei

(10) Patent No.: US 11,498,179 B2
(45) Date of Patent: Nov. 15, 2022

(54) DIRECT POSE FEEDBACK CONTROL METHOD AND DIRECT POSE FEEDBACK CONTROLLED MACHINE

(71) Applicant: LEI & SO Co., Ltd., Kaohsiung (TW)

(72) Inventor: Wei-Tai Lei, Hsinchu (TW)

(73) Assignee: LEI & SO Co., Ltd., Kaohsiung (TW)

( * ) Notice: Subject to any disclaimer, the term of this patent is extended or adjusted under 35 U.S.C. 154(b) by 70 days.

(21) Appl. No.: 17/206,138

(22) Filed: Mar. 19, 2021

(65) Prior Publication Data
US 2021/0291310 A1    Sep. 23, 2021

(30) Foreign Application Priority Data

Mar. 23, 2020   (TW) .................................. 109109666

(51) Int. Cl.
| | | |
|---|---|---|
| *B23Q 15/22* | (2006.01) | |
| *G05B 19/404* | (2006.01) | |
| *B23Q 17/22* | (2006.01) | |
| *B23Q 17/24* | (2006.01) | |

(52) U.S. Cl.
CPC ......... *B23Q 17/2266* (2013.01); *B23Q 15/22* (2013.01); *B23Q 17/2495* (2013.01); *G05B 19/404* (2013.01); *B23Q 2717/006* (2013.01)

(58) Field of Classification Search
None
See application file for complete search history.

(56) References Cited

U.S. PATENT DOCUMENTS

| | | |
|---|---|---|
| 5,681,981 A | 10/1997 | McMurtry |
| 6,226,884 B1 | 5/2001 | McMurtry |
| 6,662,461 B2 | 12/2003 | McMurtry |
| 7,810,248 B2 | 10/2010 | McMurtry |
| 10,209,048 B2 | 2/2019 | Lei |
| 10,775,147 B2 | 9/2020 | Iseli et al. |
| 2017/0153102 A1* | 6/2017 | Lei ........................ G01B 21/042 |

FOREIGN PATENT DOCUMENTS

TW    I585363 B    6/2017

* cited by examiner

*Primary Examiner* — Ryan A Jarrett
(74) *Attorney, Agent, or Firm* — CKC & Partners Co., LLC

(57) ABSTRACT

A direct pose feedback (DPF) control method applied to a DPF controlled machine is provided. The DPF control method includes a pose compensation control in addition to the position feedback control. The pose compensation control includes an initiation step, a reference system step, an actual pose calculation step and a position compensation step. The sum of the primary driving value and the compensation driving value is output to the driver of each of the motors. The advantage of the DPF control method is that the existing real-time position control loop in the controller can remain unchanged, while the pose compensation control is added to eliminate tool pose error resulted from geometric errors in the machine. The DPF controlled machine uses a pose measuring mechanism to measure the actual pose of the tool and to compensate the tool pose error. Hence, the DPF controlled machine is free of geometric errors.

29 Claims, 10 Drawing Sheets

DIRECT POSE FEEDBACK CONTROL METHOD AND DIRECT POSE FEEDBACK CONTROLLED MACHINE

RELATED APPLICATIONS

This application claims priority to Taiwan Application Serial Number 109109666, filed Mar. 23, 2020, which is herein incorporated by reference.

BACKGROUND

Technical Field

The present disclosure relates to a feedback control method and a feedback controlled machine. More particularly, the present disclosure relates to a direct pose feedback control (DPF) method and a direct pose feedback controlled machine.

Description of Related Art

The positioning of a CNC machine tool or an industrial robot is accompanied with geometric errors, which can be generally represented by six error items. For example, the positioning of X-axis of a CNC machine tool is characterized by a linear positioning error in X-axis, two straightness errors in Y- and Z-axis, and three rotational errors (roll, pitch and yaw) rotating about the X-, Y- and Z-axis, respectively. In addition, there are squareness errors between axes of the CNC machine tool. Similarly, the Denavit-Hartenberg kinematic parameters of a robotic manipulator are bounded with geometric errors. It is important for the machine builders to find ways to effectively reduce the positioning errors.

In addition to the geometric errors, the machine in operation has thermal errors caused by the ambient temperature change and heat sources in the machine. These heat sources include the friction between the moving parts, e.g., the main spindle bearing, the balls in the ball screw or the linear guide. The energy conversion in the servo motors also generates heat. In order to improve the machine accuracy, the thermal errors of the machine have to be eliminated or reduced. For example, temperature sensors are embedded in the machine to measure the temperatures of some components, so that the thermal errors of the machine can be predicted and compensated.

The geometric and thermal errors in the machine lead to pose error between the tool and the workpiece. The pose error includes position errors and orientation errors. An advanced CNC controller can compensate the above mentioned geometric errors through input of position dependent geometric errors (PDGE) and position independent geometric errors (PIGE). The laser interferometer can be used to measure the 18 PDGEs and 3 PIGEs of a three-axis machine tool. However, the compensation of the geometric errors is not always satisfied, since the 21 geometric errors are affected by the thermal status of the machine tool.

In U.S. Pat. Nos. 5,681,981 A, 6,226,884 B1 and 6,662,461 B2, a measuring device and a measuring method based on a Stewart platform mechanism are disclosed. A first platform and a second platform are connected by six telescopic ball bars to form a parallel mechanism, and through measuring the length of each of the telescopic ball bars, the coordinate of the first platform relative to that of the second platform can be calculated in a measuring computer. In U.S. Pat. No. 7,810,248 B2, a coordinate measuring device is disclosed, and the telescopic ball bars connected between two platforms are so arranged that a working space facilitating loading and unloading the workpiece can be advantageous. In U.S. Pat. No. 10,775,147 B2, a hexapod coordinate measuring machine is disclosed, and each of the telescopic ball bars connected between the two platforms has an air bearing design.

The kinematic parameters of the Stewart platform (SP) are bounded with geometric and thermal errors. To use the SP-based measuring device for real-time applications, methods must be provided to eliminate these errors. In Taiwan patent No. 1585363 B and U.S. Pat. No. 10,209,048 B2, the applicant has proposed methods to compensate the geometric and thermal errors of ball bars in a measurement system.

SUMMARY

According to one aspect, a direct pose feedback (DPF) control method applied to a direct pose feedback controlled machine is provided. The direct pose feedback controlled machine includes a machine body, a controller, a plurality of motors, a pose measuring mechanism and a tool. The pose measuring mechanism is disposed between a workpiece-side and a tool-side of the machine body and includes a tool platform disposed at the tool-side, a base platform disposed at the workpiece-side, at least six working double ballbars connected to the tool platform and the base platform, a reference plate and at least one reference double ballbar disposed on the reference plate. The direct pose feedback control method includes a pose compensation control in addition to a position feedback control, and the pose compensation control includes an initiation step, a reference system step, an actual pose calculation step and a position compensation step. In the initiation step, a central distance function of the at least one reference double ballbar, a central distance function of each of the working double ballbars and a coordinate transformation between a tool platform coordinate system and a base platform coordinate system are built. In the reference system step, the coordinate transformation between the base platform coordinate system and a reference coordinate system is built according to setting parameters, loaded setting values or results of an on-machine measurement. In the actual pose calculation step, displacement values of the working double ballbars and the reference double ballbar and motor positions are read in real-time by the controller, thermal errors of the working double ballbars are compensated based on the displacement value of the reference double ballbar, a direct kinematic transformation of the pose measuring mechanism is performed and an actual pose and a pose error of the tool are calculated. In the position compensation step, a position compensation value for each of the motors is obtained from a target pose for compensation and the actual pose. For each of the motors, a compensation controller generates a compensation driving value according to the position compensation value, and a position controller generates a primary diving value according to a setting value and an actual position value. The sum of the primary driving value and the compensation driving value is output to a corresponding driver, and the position compensation value is effective until updated by the pose compensation control.

According to another aspect, a direct pose feedback controlled machine is provided, which includes a machine body and a tool, a plurality of motors disposed on the machine body, a controller and a pose measuring mechanism. The controller is configured to drive the tool to move relative to a workpiece. The pose measuring mechanism is disposed between a workpiece-side and a tool-side of the machine body and includes a tool platform, a base platform, at least six working double ballbars, a reference plate and at least one reference double ballbar. The tool platform is disposed at the tool-side and the base platform is disposed at the workpiece-side. The working double ballbars are connected to the tool platform and the base platform via ball joints. The reference plate includes at least two three-point support sockets and the reference double ballbar is disposed on the three-point support sockets. The controller compensates thermal errors of the pose measuring mechanism based on displacement value of the at least one reference double ballbar, uses the pose measuring mechanism to obtain an actual pose of the tool and a tool pose error, and generates a position compensation value and a compensation driving value for each of the motors to eliminate the tool pose error.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
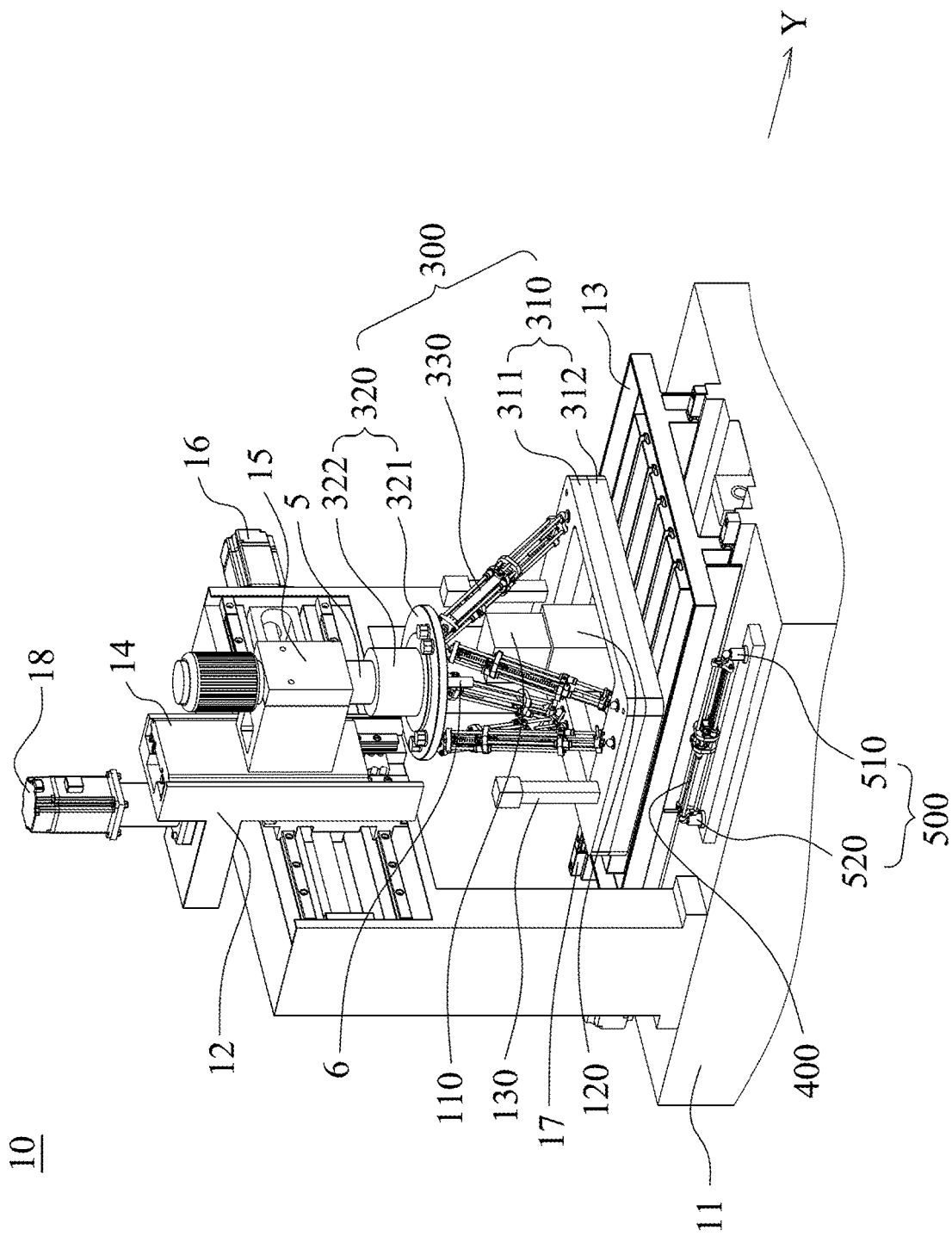
FIG. 1 shows a schematic view of a DPF controlled CNC machine tool according to one embodiment of the present disclosure.

It will be understood that when an element (or mechanism or module) is referred to as being "disposed on", "connected to" or "coupled to" another element, it can be directly disposed on, connected or coupled to the other elements, or it can be indirectly disposed on, connected or coupled to the other elements, that is, intervening elements may be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Due to manufacturing and assembling errors in components, a machine is bounded with geometric errors. Besides, external and internal heat sources can induce deformation of components and cause thermal errors in the machine. These geometric and thermal errors lead to the tool pose error by positioning of the tool relative to the workpiece. According to one aspect of the present disclosure, a direct pose feedback (DPF) control method is provided. A machine that performs the DPF control method is called as a DPF controlled machine. In the DPF control method, a pose measuring mechanism is arranged to measure the actual tool pose directly. The tool pose error can be determined and a pose compensation control is conducted to drive the motors to eliminate the tool pose error. As a result, the positioning of a DPF controlled machine becomes perfect and is free of geometric and thermal errors.

The DPF controlled machine can be a multi-axis machine tool, a multi-joint robotic arm or a parallel kinematics machine, for example a linapod or a hexapod. The kinematics of the DPF controlled machine can be parallel or serial, and its motors are configured to drive the tool to move relative to the workpiece. The pose measuring mechanism is disposed between a tool-side and a workpiece-side of the DPF controlled machine, and includes a tool platform disposed at the tool-side, a base platform disposed at the workpiece-side, and at least six working double ballbars connected to the tool platform and the base platform. The pose measuring mechanism further includes a reference plate, and at least one reference double ballbar is disposed on two three-point support sockets of the reference plate.

The distance between the two balls at the ends of the double ballbar is named as central distance. The double ballbar uses a displacement sensor to measure the central distance. Generally, due to the geometric errors in the double ballbar, the relationship between the measured displacement and the central distance is not linear. To obtain an accurate central distance from the measured displacement, a central distance function can be built to describe the relationship between the measured displacement and the central distance.

The changing ambient temperature can cause thermal errors in the six working double ballbars and reduce the accuracy of the pose measuring mechanism. The present disclosure provides at least one reference double ballbar disposed on two sockets of the reference plate. The reference plate has near-zero coefficient of thermal expansion, so that the distance between the two sockets is not influenced by the changing ambient temperature. Nevertheless, the changing ambient temperature causes a change of the displacement value of the reference double ballbar. This measured displacement value shows the effect of the thermal error on the reference double ballbar. Since the reference double ballbar and the six working double ballbars have the same design, they have almost the same thermal behavior. The measured displacement value of the reference double ballbar can be used to determine the thermal errors of the working double ballbars and other kinematic parameters of the pose measuring mechanism efficiently and accurately.

The tool of the DPF controlled machine can be a cutting tool, a measuring or touch probe, a confocal sensor, a displacement measuring laser or an optical measuring device. In order to precisely calculate the position of the tool tip and the tool direction, the controller has to read the displacement values of all of the working double ballbars simultaneously. In one embodiment, the tool is a probe, and a trigger signal is used to latch the displacement values of the working double ballbars. This event triggering method ensures that the position of the probe ball at the moment of touch can be calculated accurately. In another embodiment, a reference ball is disposed on the base platform or the worktable to calibrate the probe. In one embodiment, the tool is a cutting tool and a tool length measuring device is disposed on the base platform or the worktable to calibrate the length of the cutting tool. In the DPF controlled machine, the thermal error of the tool, e.g., the length of the cutting tool or the probe, can be compensated based on the measured thermal error of the reference double ballbar.

The tool platform and the base platform can be integrated with components of the machine body, or mounted on the machine body using extra adapters. In one embodiment, the DPF controlled machine is a multi-axis machine tool equipped with a high-speed main spindle. The tool platform is fixed at the end of the main spindle via an adapter, whereby thermal deformation of the main spindle results in a movement of the tool platform. In another embodiment, the DPF controlled machine is a multi-joint robot, the tool platform is fixed on the tool mounting interface, and the end effector is fixed on the tool platform.

In one embodiment, in order to prevent interference between the working double ballbars and the machine body, or to increase the working stroke in a desired direction, the distribution of the ball joints on the base platform or the tool platform can be arranged asymmetrically according to the requirement of workspace. The working double ballbar can also be different in size to cooperate with the asymmetrically distributed ball joints. In one embodiment, the six ball joints on the base platform are arranged on a half circle and the six ball joints on the tool platform are shifted correspondingly.

The positions of the ball joints on the tool platform and the base platform are affected by the ambient temperature change. In order to reduce the thermal error of each ball joint, it is favorable to fix the ball joint on a material having a coefficient of thermal expansion smaller than 2 ppm/° C. or near zero, e.g., smaller than 0.1 ppm/° C. For example, the material can be INVAR, super INVAR, carbon fiber composite material, LEX-ZERO® or quartz, or glass-ceramics, such as ZERODUR® or CLEARCERAM-Z®.

In the pose measuring mechanism, ball joints are used to connect the working double ballbars with the base platform and the tool platform. In one embodiment, the ball joints consist of ball-socket pairs. In one embodiment, each socket of the base platform and the tool platform has a tapered surface and uses a magnet to attract the ball at the end of the connected working double ballbar.

In one embodiment, the DPF controlled machine is a three-axis machine tool. The tool platform is fixed on the main spindle block. The base platform is fixed on the worktable and the workpiece is fixed on the load bearing area of the base platform. The cutting tool and the workpiece are surrounded by the working double ballbars. In addition, a tool length measuring device can be disposed on the base platform to calibrate the length of the tool.

In another embodiment, the DPF controlled machine is a six-axis robotic arm mounted on a worktable of granite. The tool is a touch probe, fixed on the tool platform, which on the other hand is mounted on the tool mounting interface of the six-axis robotic arm. The base platform is disposed on the worktable and the workpiece can be disposed on the load bearing area of the base platform.

The touch probe and the workpiece are surrounded by the working double ballbars. The accuracy of a six-axis robotic arm is low. By using the pose measuring mechanism for direct pose feedback control, the accuracy of the DPF controlled six-axis robotic arm is determined by the accuracy of the pose measuring mechanism.

In another embodiment, the DPF controlled machine is a six-axis robotic arm mounted on a worktable of granite. The tool platform is fixed on the tool mounting interface of the six-axis robotic arm and a measuring probe is fixed on the tool platform. A gantry or a supporting structure is also mounted on the worktable and the base platform is fixed on the gantry or the supporting structure. In this embodiment, the gantry is a part of the pose measuring mechanism, so that the measuring probe and the workpiece are not surrounded by the working double ballbars of the pose measuring mechanism. A reference ball can be fixed on the worktable and used for the calibration of the measuring probe. This DPF coordinate measuring machine has the advantage of better accessibility for loading and unloading of workpiece. To reduce the thermal error, it is advantageous that the gantry or the supporting structure is made of material of low or near-zero coefficient of thermal expansion and high strength, such as INVAR or LEX-ZERO®. The thermal error of the gantry or the supporting structure can be compensated based on the measured displacement value of the reference double ballbar, or the measured temperatures of the environment and the gantry or the supporting structure.

In one embodiment, the controller uses a real-time communication network to receive and send control information, including displacement values of the working double ballbars and the reference double ballbar, and data of the drivers and motors. In such a way, the number of cables can be reduced dramatically. In one embodiment, the real-time communication network is EtherCAT.

The present disclosure provides a DPF control method, a tool platform coordinate system is defined on the tool platform, a base platform coordinate system is defined on the base platform, and a reference coordinate system is defined on the machine. The kinematic parameters of the pose measuring mechanism include the positions of the ball joints in the tool platform coordinate system, the positions of the ball joints in the base platform coordinate system, and the central distances of the six working double ballbars.

To obtain an accurate tool pose, the present disclosure provides means to eliminate geometric and thermal errors of the pose measuring mechanism. To eliminate the geometric errors, each working double ballbar uses a central distance function to determine its central distance from the measured displacement. Further, the measured thermal error of the reference double ballbar is used to compensate the thermal errors of the pose measuring mechanism, including the thermal errors of the working double ballbars and the thermal errors of the ball joints on the tool platform and the base platform. Therefore, the pose measuring mechanism can be highly accurate and useful for the direct pose feedback. In one embodiment, the linear accuracy of the pose measuring mechanism reaches the micron level.

The kinematic parameters of a robotic arm also have geometric and thermal errors. The controller of a robotic arm uses ideal kinematic parameters for forward and inverse kinematic transformation. The setting value of each of the motors is valid only for an ideal robotic arm.

In the position control loop of an axis, the subtraction of the actual position value from the setting value yields the following pose error. The position controller generates a driving value, e.g., a velocity command, from the following pose error. When a plurality of motors are driven simultaneously, the actual contour may deviate from the setting path, and a contour error appears. There are many advanced control methods to eliminate the following pose error or the contour error, such as the feed-forward control (FF), the cross-coupled control (CCC), the friction compensation control and the cutting force compensation control, etc. It is better to continue these control methods to work in the controller of the newly developed DPF controlled machine.

In the DPF control method of the present disclosure, in addition to the tool platform coordinate system and the base platform coordinate system of the pose measuring mechanism, the reference coordinate system of the machine and the tool tip coordinate system are managed by the controller. In the DPF control method, an actual pose and a tool pose error are calculated according to the measured displacements of the working double ballbars. Because the computation of the tool pose error is complicated and needs time, the pose feedback control loop has a dead-time problem, which is unfavorable for a servo control.

The proposed DPF control method includes a pose compensation control and a position feedback control. The actual pose of the tool is measured by the pose measuring mechanism. An encoder-defined pose is introduced, which is the tool pose of an ideal robotic arm having the measured joint positions. Therefore, the encoder-defined pose can be obtained by performing the forward kinematic transformation of the robotic arm using the measured joint positions. In the proposed DPF control method, the pose error is decomposed into a link pose error and a following pose error. The link pose error is calculated from the actual pose and the encoder-defined pose. In contrast, the following pose error is obtained from the setting pose and the encoder-defined pose. For each of the motors, the position feedback control calculates the primary driving value from the following pose error. The following pose error is the kinematic mapping of the following pose errors of all axes. The pose compensation control calculates the positon compensation value and the corresponding compensation driving value for each of the motors from the link pose error. Since the link pose error results from the geometric and thermal errors of the machine and changes slowly, the cycling time for the pose compensation control can be higher than that of the real-time position feedback control.

The advantage of the DPF control method is that the existing real-time position control loop in the controller can remain unchanged, while a new pose compensation control is added to eliminate the tool pose error resulted from errors in kinematic parameters of the machine. In this way, the dead time of the DPF control method does not cause problem in servo feedback control. The position feedback control and the pose compensation control can be arranged in the same or different timer interrupt handler. The cycling time of the pose compensation control can be higher than or equal to that of the position feedback control. In one embodiment, the setting value of each of the motors is modified by a compensation value and the original position control loop remains unchanged.

The DPF control method can be applied to different type of machines. Because of the direct pose feedback, the positioning accuracy of the DPF controlled machine is determined by the pose measuring mechanism. In one embodiment, the pose measuring mechanism is integrated with a six-axis robotic arm. The tool platform is fixed on the tool mounting interface of the robotic arm. The tool is a measuring or touch probe fixed on the tool platform. The displacement values of the working double ballbars can be latched by a trigger signal of the probe, and are read by the controller to calculate the position of the ball at the end of the probe. Because of the micron-level accuracy of the pose measuring mechanism, the DPF controlled robotic arm becomes a coordinate measuring machine.

In one embodiment, a relation between the thermal errors of the tool length and the measured displacement value of the reference double ballbar is built. The thermal errors of the tool length can be compensated based on the measured displacement value of the reference double ballbar.

FIG. 1 shows a schematic view of a DPF controlled CNC machine tool 10 according to one embodiment of the present disclosure. The DPF controlled CNC machine tool 10 includes a machine body including a bed 11, X-, Y- and Z-tables 12, 13, 14, three motors 16, 17, 18, a controller (not shown), a pose measuring mechanism 300 and a reference plate 500. The main spindle 5 (high-speed main spindle) is mounted on the Z-table 14 of the DPF controlled CNC machine tool 10. The tool 6 is mounted on the main spindle 5, which is mounted on a main spindle block 15. The controller is configured to drive the motors to position the tool 6 relative to a workpiece 110. The pose measuring mechanism 300 is disposed between the Y-table 13 (workpiece-side) and the main spindle 5 (tool-side) of the DPF controlled CNC machine tool 10 and includes a tool platform 320, a base platform 310, six working double ballbars 330 and at least one reference double ballbar 400. The reference plate 500 includes at least two magnetic sockets 510 and 520 and the reference double ballbar 400 is disposed on the two magnetic sockets 510 and 520. The tool platform 320 can be fixed on the main spindle 5 via the supporting layer 322 of the tool platform 320 or an adapter.

As shown in FIG. 1, the pose measuring mechanism 300 is used to close the kinematic gap between the tool 6 and the Y-table 13. The tool platform 320 composes of a positioning layer 321 and a supporting layer 322. The base platform 310 also composes of a positioning layer 311 and a supporting layer 312. In this embodiment, six ball sockets are disposed on each positioning layer 311 and 321 to connect the balls at the ends of the working double ballbars 330 to form ball joints. The positioning layers 311 and 321 are made of materials having a coefficient of thermal expansion smaller than 2 ppm/° C. Consequently, the positions of the sockets or the ball joints on the positioning layers 311 and 321 are thermally stable. In contrast, the supporting layers 312 and 322 can bear mounting force without changing the positions of the ball joints thereon.

To be more specific, the tool platform 320 is fixed on the main spindle 5 via the supporting layer 322, which is a circular plate made of INVAR. The positioning layer 321 is made of quartz glass, and six sockets are disposed thereon. The base platform 310 is fixed on the Y-table 13 via the supporting layer 312, which is a hollow square plate made of INVAR. The positioning layer 311 is made of quartz glass, and six sockets are disposed thereon. The workpiece 110 is fixed on the Y-table 13 via a block 120 located in the hollow portion of the base platform 310. Six working double ballbars 330 connect the tool platform 320 and the base platform 310 to form the pose measuring mechanism 300. In this embodiment, the tool 6 and the workpiece 110 are surrounded by the working double ballbars 330.

The DPF controlled CNC machine tool 10 can further include a tool length measuring device 130 disposed on the base platform 310, which is configured to measure the tool length. In other embodiments, the tool length measuring device can be disposed on the Y-table, and the present disclosure is not limited thereto. In addition, the reference double ballbar 400 is disposed on the reference plate 500, which is disposed on the bed 11. The reference plate 500 is made of material with near zero coefficient of thermal expansion, such as ZERODUR®.

Figure 2:
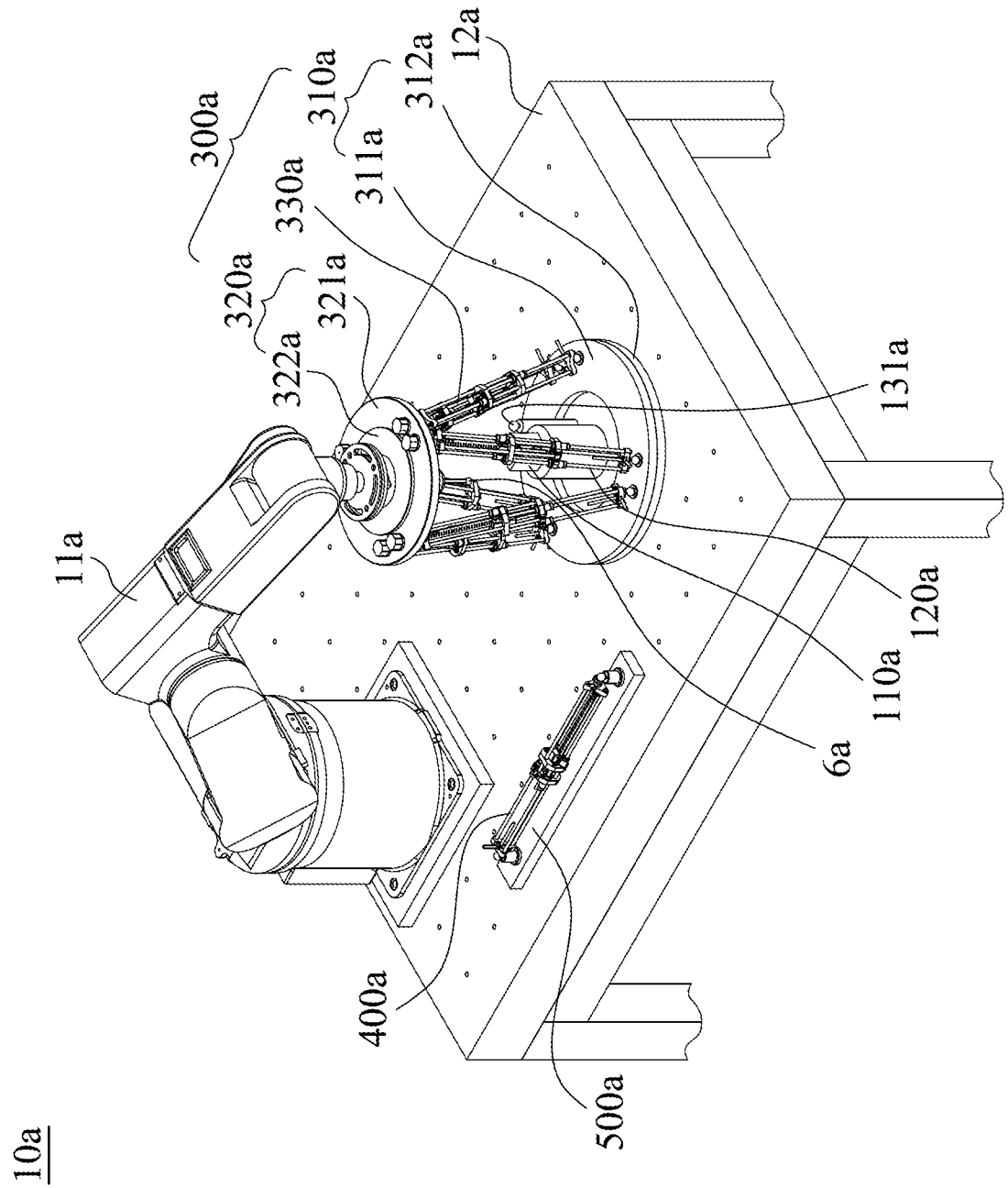
FIG. 2 shows a schematic view of a DPF controlled machine according to another embodiment of the present disclosure.

FIG. 2 shows a schematic view of a DPF controlled machine 10a according to another embodiment of the present disclosure. In the embodiment of FIG. 2, the DPF controlled machine 10a includes a robotic arm 11a and a worktable 12a. The worktable 12a is made of granite. The robotic arm 11a is disposed on the worktable 12a. The tool platform 320a is fixed on the tool mounting interface (tool-side) of the robotic arm 11a. The tool is fixed on the tool platform 320a and can be a measuring probe or a touch probe. The base platform 310a is fixed on the worktable 12a (workpiece-side), and the reference plate 500a is disposed on the worktable 12a. This DPF controlled machine 10a becomes a coordinate measuring machine and can be used to measure small workpiece 110a on shop floor without temperature control.

The base platform 310a has a two-layer structure, and the positioning layer 311a of the base platform 310a is a hollow plate made of quartz glass. The supporting layer 312a is a circular plate made of INVAR. The workpiece 110a is fixed on the workpiece holder 120a. The tool platform 320a includes a positioning layer 321a made of quartz glass and a supporting layer 322a made of INVAR. The six working double ballbars 330a connect the tool platform 320a and the base platform 310a to form the pose measuring mechanism 300a. The tool, a probe 6a, and the workpiece 110a are surrounded by the working double ballbars 330a. The reference double ballbar 400a is disposed on the reference plate 500a. The trigger signal of the probe 6a is used to latch the displacement values of the working double ballbars 330a simultaneously. Based on the latched displacement values, the controller calculates the position of the probe 6a. Additionally, the DPF controlled machine 10a has a reference ball 131a disposed on the base platform 310a for the calibration of the probe 6a.

Figure 3:
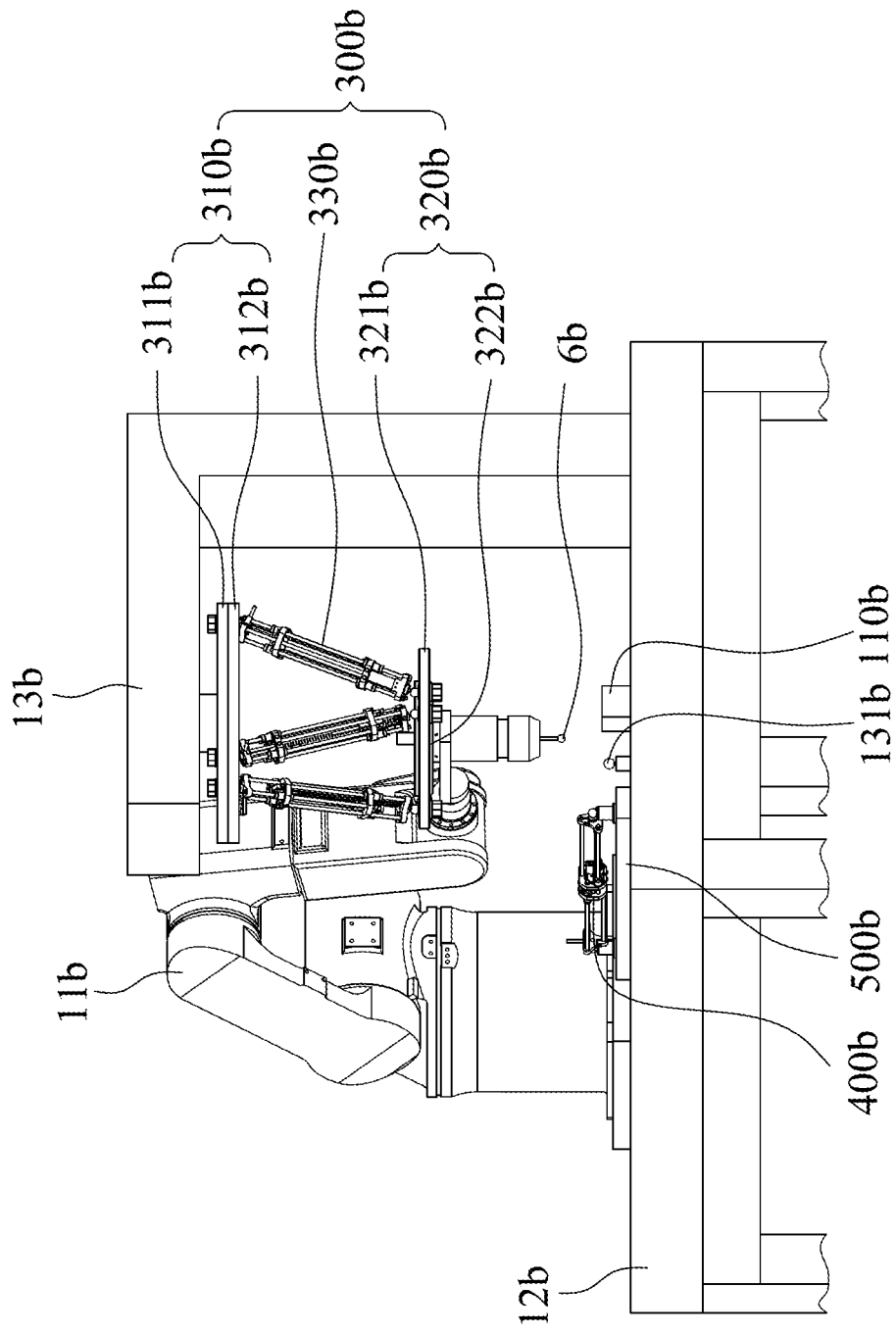
FIG. 3 shows a schematic view of a DPF controlled machine according to yet another embodiment of the present disclosure.

FIG. 3 shows a schematic view of a DPF controlled machine 10b according to yet another embodiment of the present disclosure. Referring to FIG. 3, the DPF controlled machine 10b includes a robotic arm 11b, a worktable 12b made of granite, and a gantry 13b. The robotic arm 11b and the gantry 13b are disposed on the worktable 12b. In FIG. 3, only the right half of the gantry 13b is illustrated in order to show other components.

In the embodiment shown in FIG. 3, the base platform 310b of the pose measuring mechanism 300b is disposed on the gantry 13b (workpiece-side). The base platform 310b has two-layer structure, and the positioning layer 311b is a circular plate made of quartz glass, supported by the supporting layer 312b made of INVAR. The tool platform 320b is fixed on the tool mounting interface at the end of the robotic arm 11b (tool-side). The tool platform 320b also has a two-layer structure. The positioning layer 321b is a circular plate made of quartz glass, supported by the supporting layer 322b made of INVAR. The six working double ballbars 330b connect the tool platform 320b and the base platform 310b; hence, the probe 6b and the workpiece 110b are located outside the pose measuring mechanism 300b. The inverse arrangement of the pose measuring mechanism 300b enables more operational space for loading or unloading of the workpiece 110b.

In addition, a thermal error model of the gantry 13b is built in the controller 200b (shown in FIG. 4), so that the thermal error of the gantry 13b can be compensated based on the measured displacement value of the reference double ballbar 400b on the reference plate 500b or the measured results of temperature sensors. Similarly, the thermal error of the length of the probe 6b can also be compensated. The DPF controlled machine 10b can further include a reference ball 131b disposed on the worktable 12b to calibrate the probe 6b.

Figure 4:
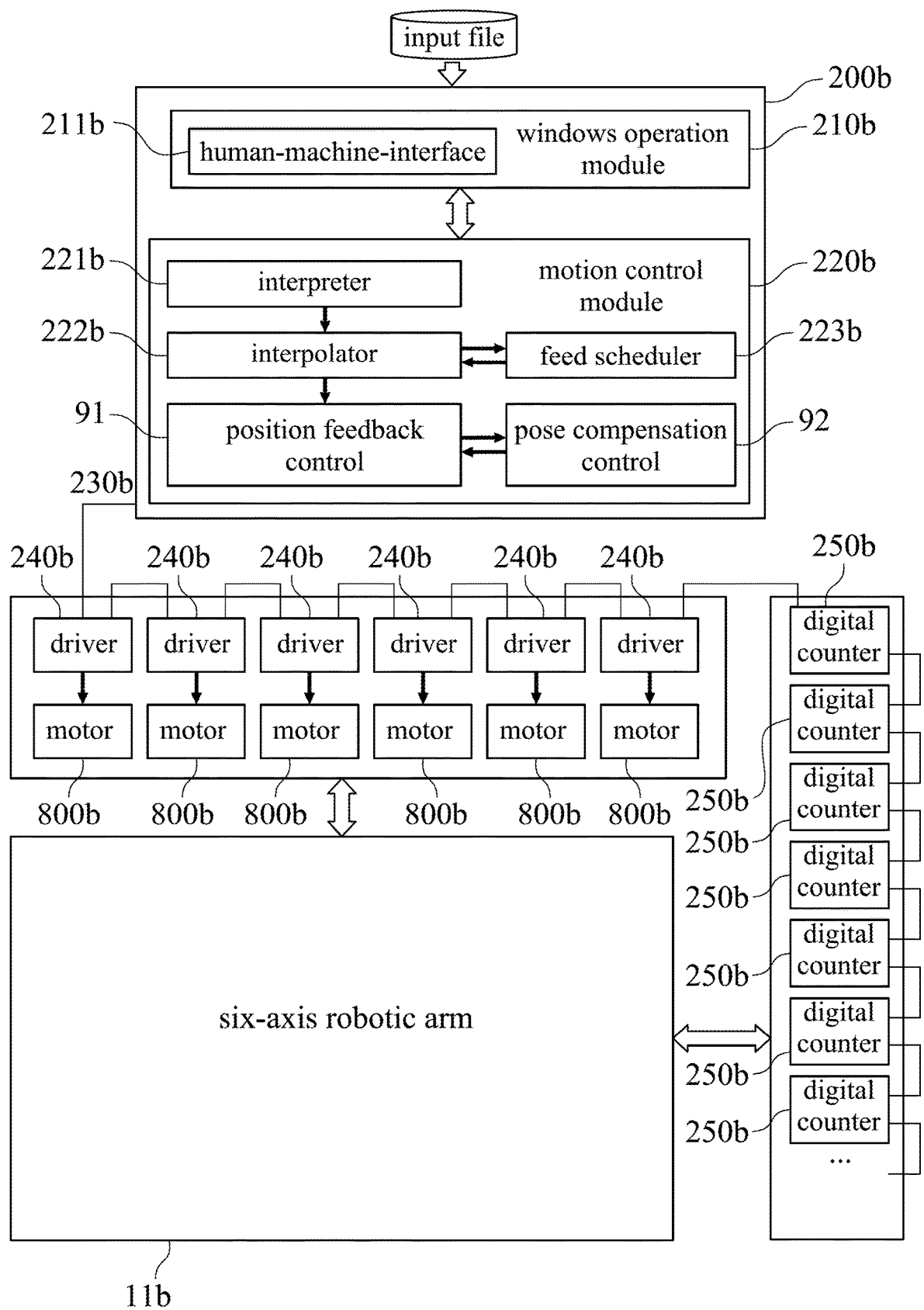
FIG. 4 shows a block diagram of a DPF controlled machine according to the embodiment of FIG. 3.

FIG. 4 shows a block diagram of the DPF controlled machine 10b according to the embodiment of FIG. 3. The controller 200b includes a human-machine-interface 211b working in a widows operation module 210b and a motion control module 220b. The motion control module 220b consists of an interpreter 221b, an interpolator 222b and a feed scheduler 223b, all working in a real-time environment and cooperating with the position feedback control 91 and the pose compensation control 92. The position feedback control 91 and the pose compensation control 92 will be described later. The controller 200b can use a real-time communication network 230b to communicate with peripheral devices such as digital counters 250b (digital/analog counters) and drivers 240b of motors 800b.

To be more specific, the controller 200b communicates with six drivers 240b and seven digital counters 250b via the EtherCAT and obtains the actual positions of the motors 800b, the displacement values of the working double ballbars 330b and the displacement value of the reference double ballbar 400b, performs the position feedback control 91 and the pose compensation control 92, and sends driving values to the drivers 240b. The displacement sensor of the working double ballbar 330b or the reference double ballbar 400b can be a laser interferometer, an optical scale or a magnetic scale. The displacement sensors can be absolute or incremental, but the present disclosure is not limited thereto.

The forward kinematic transformation of the robotic arm 11b calculates the tool pose $P=(X,Y,Z,\alpha,\beta,\gamma)^T$ from given joint positions $\theta=(\theta_1,\theta_2,\theta_3,\theta_4,\theta_5,\theta_6)^T$. A small variation of the joint positions, represented by $\Delta\theta$, where $\Delta\theta=(\Delta\theta_1,\Delta\theta_2,\Delta\theta_3,\Delta\theta_4,\Delta\theta_5,\Delta\theta_6)^T$, leads to a small variation of the tool pose, represented by $\Delta P$, where $\Delta P=(\Delta X,\Delta Y,\Delta Z,\Delta\alpha,\Delta\beta,\Delta\gamma)^T$. The relationship between the $\Delta\theta$ and the $\Delta P$ is shown in equation (1):

$$\Delta P = J \cdot \Delta\theta \quad (1);$$

Where J is the Jacobian matrix. From equation (1), if the tool pose error $\Delta P$ is known, the corresponding joint variation $\Delta\theta$ can be obtained as the product of the inverse Jacobian matrix $J^{-1}$ and the tool pose error $\Delta P$ as follows:

$$\Delta\theta = J^{-1} \cdot \Delta P \quad (2).$$

Figure 5:
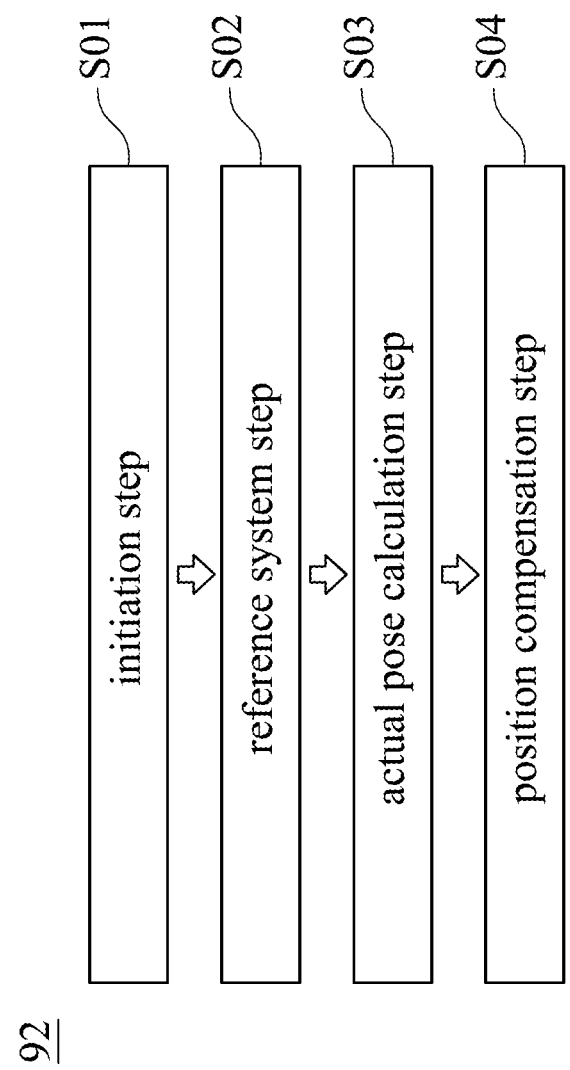
FIG. 5 shows a flow chart of a pose compensation control according to another embodiment of the present disclosure.
Figure 6:
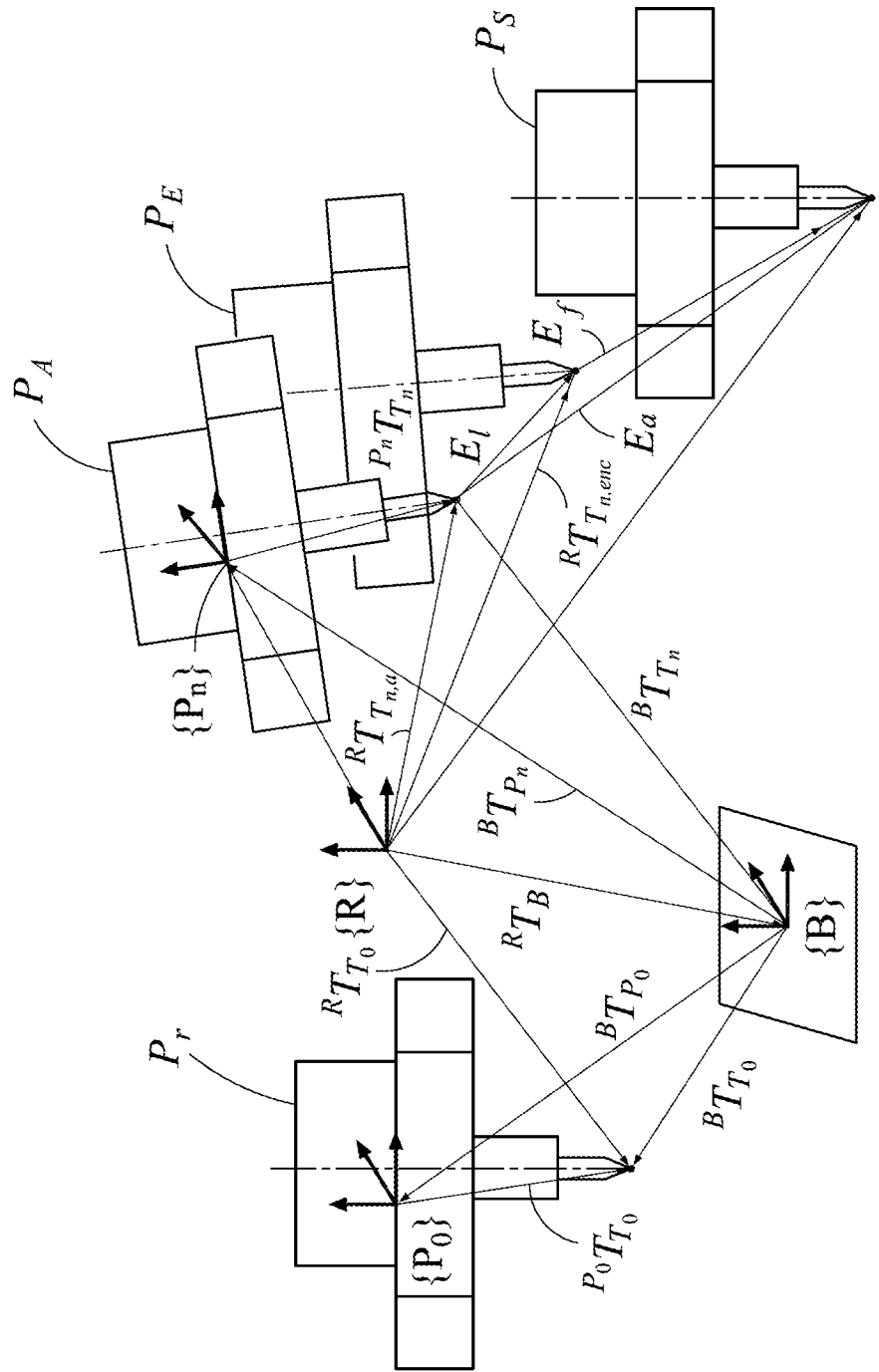
FIG. 6 shows a schematic diagram of the tool poses according to the embodiment of FIG. 5.
Figure 7:
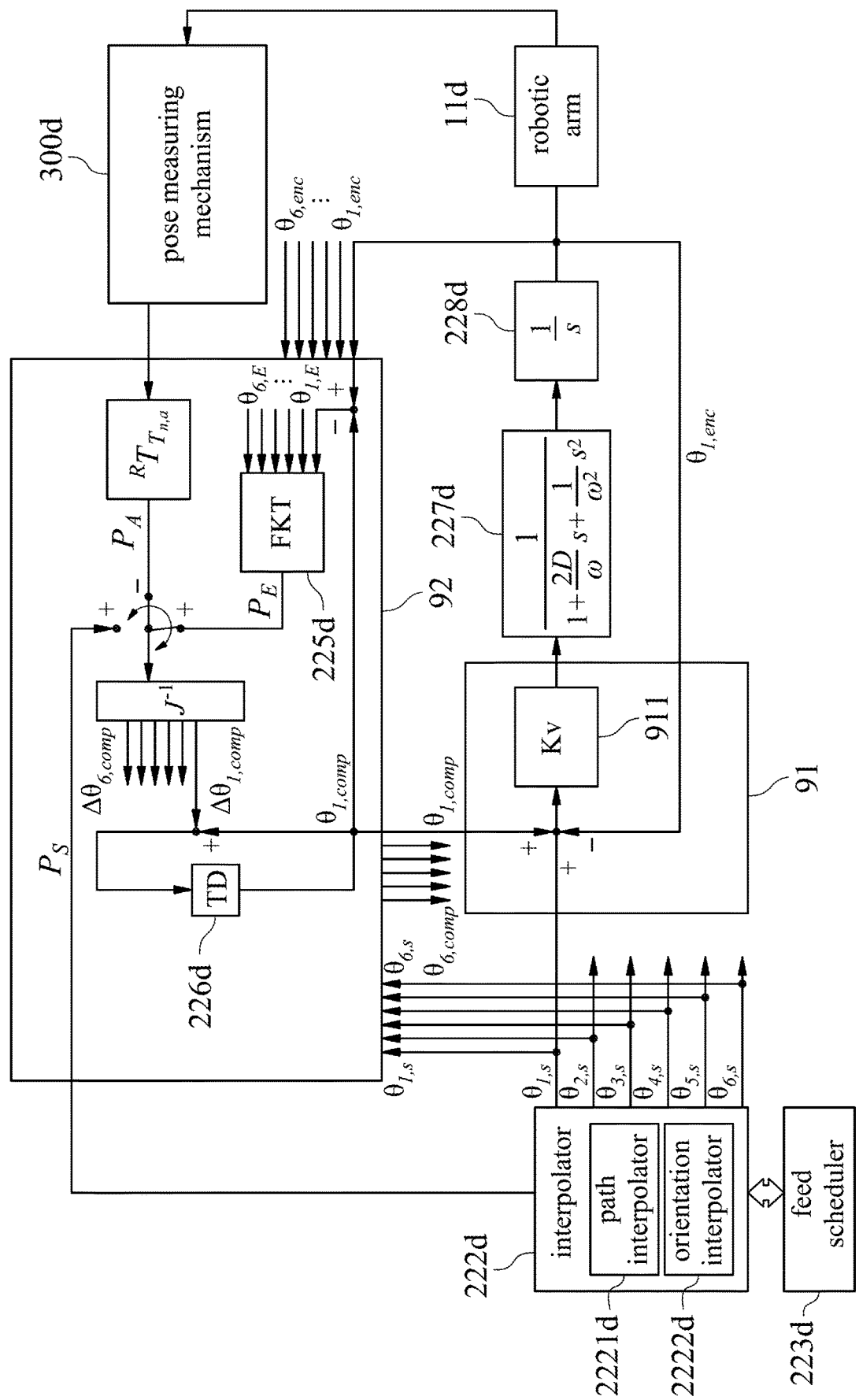
FIG. 7 shows a block diagram of a DPF control method according to the embodiment of FIG. 5.
Figure 8:
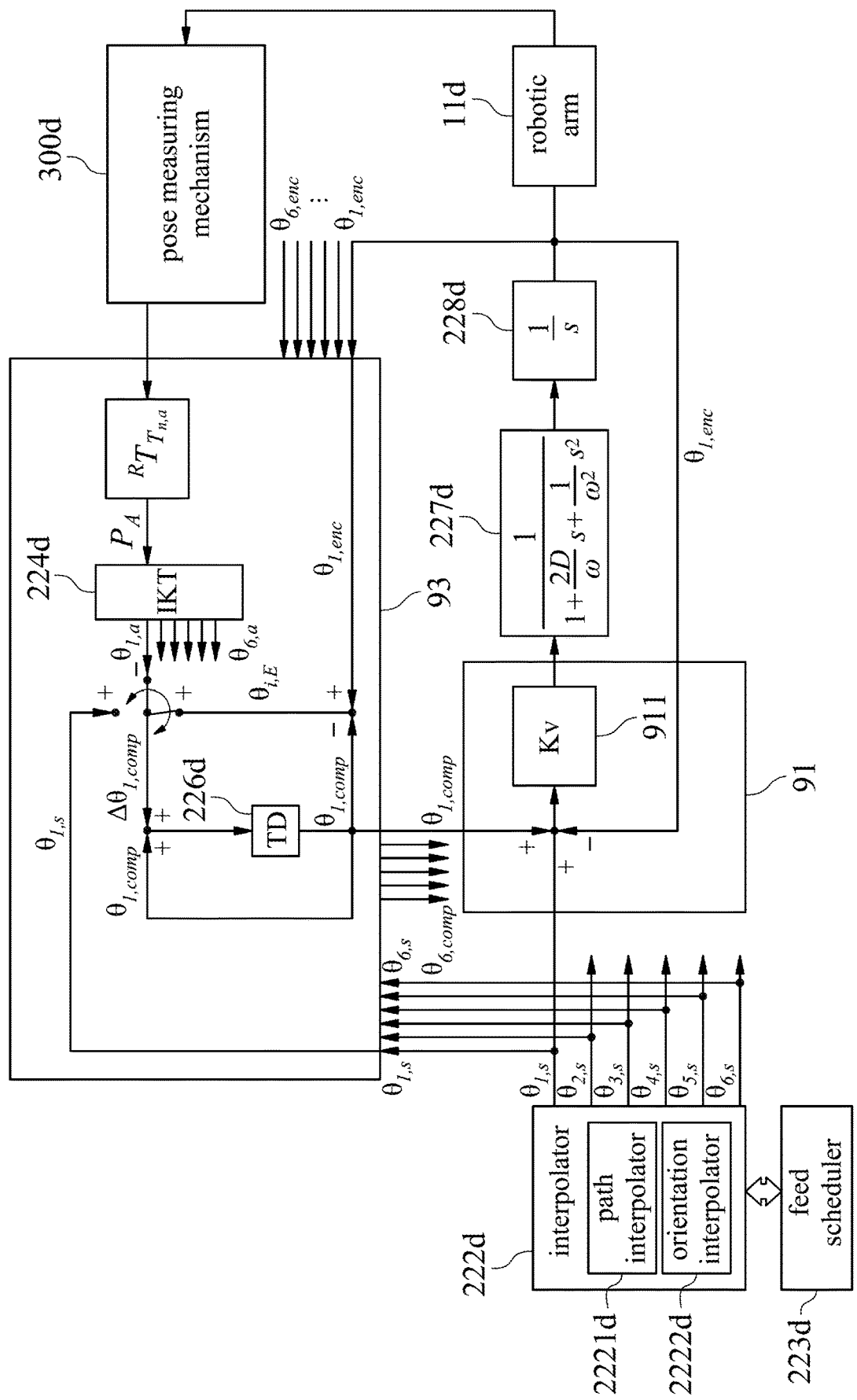
FIG. 8 shows a block diagram of another DPF control method according to the embodiment of FIG. 5.
Figure 10:
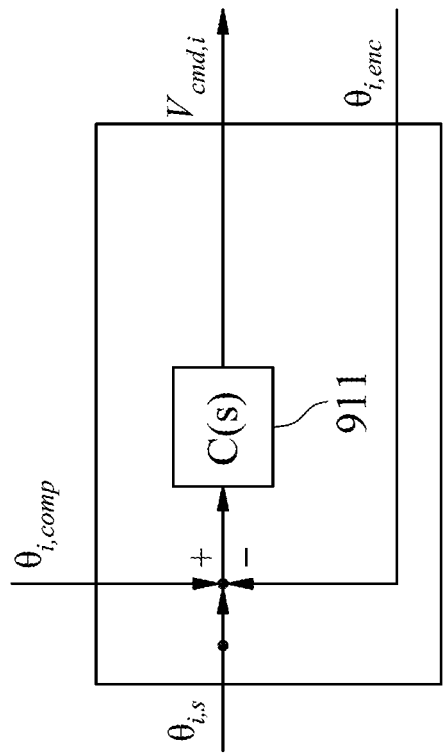
FIG. 10 shows a block diagram of a modified position controller.
Figure 9:
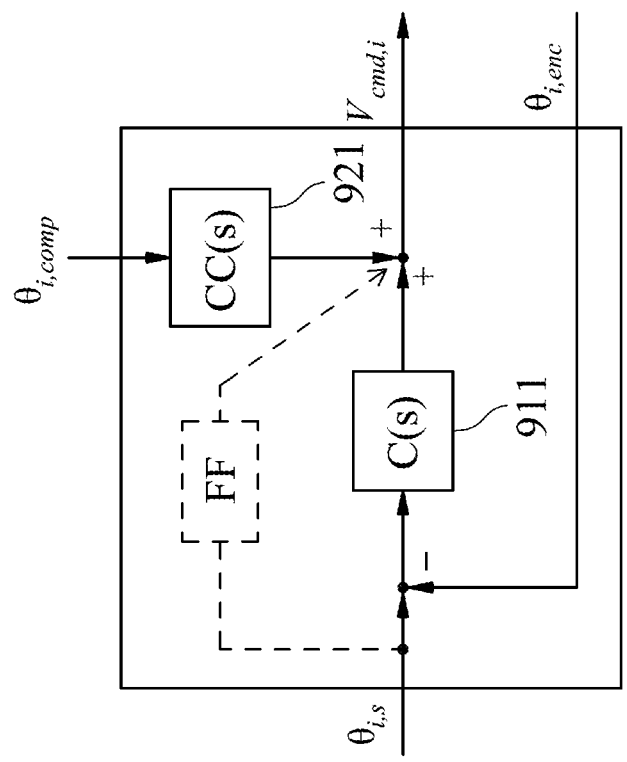
FIG. 9 shows a block diagram of a position controller and a compensation controller.

FIG. 5 shows a flow chart of a pose compensation control according to another embodiment of the present disclosure. FIG. 6 shows a schematic diagram of the tool poses according to the embodiment of FIG. 5. FIG. 7 shows a block diagram of a DPF control method according to the embodiment of FIG. 5. FIG. 8 shows a block diagram of another DPF control method according to the embodiment of FIG. 5. FIG. 9 shows a block diagram of a position controller and a compensation controller. FIG. 10 shows a block diagram of a modified position controller. In FIGS. 7 and 8, the drive system 227d is represented by a second order transfer function, characterized by the nominal angular frequency ω and the damping gradient D. The transfer function of the integral element 228d is 1/s. The DPF control method of the present disclosure extends the existing position feedback control 91 with a pose compensation control 92 or 93. In the block diagram of the DPF control system, the subscript i indicates the i-th motor. For example, $\theta_{1,comp}$ and $\theta_{i,comp}$ represent the position compensation values of the first and the i-th motor, respectively.

As shown in FIG. 5, the pose compensation control 92 can include an initiation step S01, a reference system step S02, an actual pose calculation step S03 and a position compensation step S04. In the initiation step S01, the pose measuring mechanism 300d is initialized and the coordinate transformation $^{B}T_{P_0}$ between the tool platform coordinate system $\{P_0\}$ and the base platform coordinate system $\{B\}$ is established in the controller.

In the reference system step S02, a coordinate transformation P between the base platform coordinate system $\{B\}$ and a reference coordinate system $\{R\}$ of the machine is established in the controller according to setting parameters, loaded setting values or results of an on-machine measurement.

In the actual pose calculation step S03, the displacement values of the working double ballbars and the reference ballbar and the positions of the motors are read by the controller, and the actual pose $P_A$ of the tool is calculated.

In the position compensation step S04, position compensation values $\theta_{i,comp}$ for the motors are calculated in the pose compensation control 92 from a target pose and the actual pose $P_A$ of the tool.

In the embodiments shown in FIGS. 7 and 8, the position controller 911 is a proportional gain $k_v$. Taking the servo control of the first motor as an example, a position compensation value $\theta_{1,comp}$ is obtained by the pose compensation control 92, which is used to correct the setting value $\theta_{1,s}$ for the position feedback control 91. The control block in FIG. 10 shows a position controller 911 used for both position feedback control 91 and pose compensation control 92, and its transfer function is represented by C(s). In FIG. 9, the pose compensation control 92 has its own compensation controller 921 with a transfer function of CC(s). The position feedback control 91 has a position controller 911 with a transfer function of C(s). The output of the compensation controller 921 and the output of the position controller 911 are summed and sent to the driver. In addition, the position compensation value obtained by the pose compensation control 92 remains effective until a new position compensation value is generated.

To be more specific, the homogeneous transformation matrix can be used to describe the coordinate transformation between two coordinate systems. In the initiation step S01, the kinematic parameters of the pose measuring mechanism 300d are initiated, including the central distance functions of the working double ballbars and the reference double ballbars, the positions of the sockets or ball joints on the tool platform and the base platform. In one embodiment, at least one of the motors is driven to allow each working double ballbar to pass a reference mark on the optical scale and to initiate the central distance function. In the reference system step S02, the reference coordinate system $\{R\}$ of the machine is built according to setting parameters, or the loaded setting values. The pose measuring mechanism 300d can also be used to perform an on-machine measurement to build the reference coordinate system $\{R\}$. In one embodiment, two motors are driven one by one for positioning. The pose measuring mechanism measures an orientation or a location or both of the driven axis. From the two identified machine axes, the reference coordinate system $\{R\}$ or the machine coordinate system can be built using the vector product of the identified axis vectors. After the reference coordinate system $\{R\}$ is known, a coordinate transformation $^{R}T_{B}$ between the base platform coordinate system $\{B\}$ and the reference coordinate system $\{R\}$ is built, see FIG. 6, and an initial reference pose $P_r$ and initial position compensation values for the motors are obtained. The tool platform coordinate system is represented by $\{P_0\}$, also called the initial tool platform coordinate system $\{P_0\}$, and the coordinate transformation $^{B}T_{P_0}$ between the tool platform coordinate system $\{P_0\}$ and the base platform coordinate system $\{B\}$ is obtained by performing direct or forward kinematic transformation of the pose measuring mechanism 300d. The coordinate transformation $$^{P_0}T_{T_0}$$

between the tool tip coordinate system $\{T_0\}$ and the tool platform coordinate system $\{P_0\}$ is constant, and can be known after the tool calibration. Hence, the coordinate transformation $$^{B}T_{T_0}$$

between the tool tip coordinate system $\{T_0\}$ and the base platform coordinate system $\{B\}$ can be obtained by $$^{B}T_{T_0} = {^{B}T_{P_0}} \cdot {^{P_0}T_{T_0}}$$

The coordinate transformation $$^{R}T_{T_0}$$

between the tool tip coordinate system $\{T_0\}$ and the reference coordinate system $\{R\}$ can be obtained by $$^{R}T_{T_0} = {^{R}T_{B}} \cdot {^{B}T_{T_0}}.$$

If the DPF controlled machine is a three-linear-axis machine tool, in the reference system step S02, the machine tool can be driven to position in X-, Y- and Z-axis. The pose measuring mechanism 300d measures a plurality of positioning points. A processing of these measured points can obtain three axis vectors $x_{act}$, $y_{act}$ and $z_{act}$, representing the three actual axes of the machine tool. An ideal machine coordinate system can be built from the axis vectors $x_{act}$, $y_{act}$ and $z_{act}$. For example, the axis vector $x_{act}$ is defined as the ideal X-axis $x_{ideal}$. Subsequently, the ideal Z-axis $z_{ideal}$ can be obtained as the vector product of $x_{act}$ and $y_{act}$, $z_{ideal} = x_{act} \times y_{act}$. Finally, the ideal Y-axis $y_{idea}$ can be obtained as the vector product of $z_{ideal}$ and $x_{ideal}$, $y_{ideal} = z_{ideal} \times x_{ideal}$. The three perpendicular axes $x_{ideal}$, $y_{ideal}$ and $z_{ideal}$ can be used to define the ideal machine coordinate system or the reference coordinate system $\{R\}$. The coordinate transformation from the reference coordinate system $\{R\}$ to the base platform coordinate system $\{B\}$ is $^{R}T_{B}$; and the inverse coordinate transformation from the base platform coordinate system $\{B\}$ to the reference coordinate system $\{R\}$ is $^{B}T_{R} = {^{R}T_{B}}^{-1}$.

If the DPF controlled machine is a robotic arm 11a in FIG. 2 or 11b in FIG. 3, the reference coordinate system $\{R\}$ can be built by using the pose measuring mechanism 300a or 300b to identify the actual rotational axis of the first and the second joint. The reference coordinate system $\{R\}$ of the robotic arm 11a or 11b can be built based on the two identified axes, and the coordinate transformation $^{R}T_{B}$ between the reference coordinate system $\{R\}$ and the base platform coordinate system $\{B\}$ is derived. Note that $^{B}T_{R} = {^{R}T_{B}}^{-1}$.

As shown in FIG. 7, the interpolator 222d can include a path interpolator 2221d and an orientation interpolator 2222d. The feed scheduler 223d is used to schedule the acceleration and the deceleration along the setting path. The interpolator 222d generates in real-time a setting pose $P_S$, that is, $P_S=(X,Y,Z,\alpha,\beta,\gamma)_S^T$, wherein $(X,Y,Z)$ represents the setting position of the tool tip and $(\alpha,\beta\gamma)$ represents the setting tool orientation, e.g., three rotational angles. Then the inverse kinematic transformation is used to calculate the corresponding position setting vector $\theta_s=(\theta_{1,s},\theta_{2,s},\theta_{3,s},\theta_{4,s},\theta_{5,s},\theta_{6,s})^T$ for each joint motor. Since the tool is fixed on the tool platform, the coordinate transformation $^{P_0}T_{T_0}$ (between the tool tip coordinate system $\{T_0\}$ and the tool platform coordinate system $\{P_0\}$ is constant. The n-th coordinate transformation $$^{P_n}T_{T_n}$$

between the actual tool tip coordinate system $\{T_n\}$ and the actual tool platform coordinate system $\{P_n\}$ is equal to the initial one, as shown in equation (3). A coordinate transformation $$^{R}T_{T_{n,a}}$$

between the actual tool tip coordinate system $\{T_n\}$ and the reference coordinate system $\{R\}$ can be obtained from equation (4) as follows:

$$^{P_n}T_{T_n} = {}^{P_0}T_{T_0}; \qquad (3)$$

$$^{R}T_{T_{n,a}} = {}^{R}T_B \cdot {}^{B}T_{P_n} \cdot {}^{P_n}T_{T_n} = {}^{R}T_B \cdot {}^{B}T_{P_n} \cdot {}^{P_0}T_{T_0}. \qquad (4)$$

In equation (4), the coordinate transformation $^{B}T_{P_n}$ between the actual tool platform coordinate system $\{P_n\}$ and the base platform coordinate system $\{B\}$ is measured by the pose measuring mechanism 300d. Through equation (4), the actual tool tip coordinate system $\{T_n\}$ can be transformed into the reference coordinate system $\{R\}$ to obtain the actual pose $P_A$ of the tool, where $P_A=(X,Y,Z,\alpha,\beta,\gamma)_4$. The coordinate transformation between the actual tool tip coordinate system $\{T_n\}$ and the base platform coordinate system $\{B\}$ can be represented by $$^{B}T_{T_n}.$$

The coordinate transformation between the encoded-defined tool pose coordinate system $\{T_{n,enc}\}$ and the reference coordinate system $\{R\}$ is represented by $$^{R}T_{T_{n,enc}}.$$

The actual pose error $E_a$ can be obtained from the setting pose $P_S$ and the measured actual pose $P_A$, whereby $E_a=P_S-P_A$ $(\Delta X,\Delta Y,\Delta Z,\Delta\alpha,\Delta\beta,\Delta\gamma)_A^T$. Since the forward and backward kinematic transformations of the pose measuring mechanism 300d are very complicated, and the forward and backward kinematic transformations of the robotic arm 11d also need a lot of time, the computing time to obtain the actual pose error can be too large to implement in real-time pose feedback control. In the pose compensation control 92 of the DPF control method of the present disclosure, three tool poses are defined, the actual pose $P_A$ the encoder-defined pose $P_E$ and the setting pose $P_S$, as shown in FIG. 6. The encoder-defined pose $P_E$ is a pose defined by an ideal robotic arm having the measured encoder or joint values. The encoder value $\theta_{i,E}$ of the i-th joint can be obtained by subtracting the position compensation value $\theta_{i,comp}$ of the i-th joint from the actual position value $\theta_{i,enc}$ of the i-th joint, $\theta_{i,E}=\theta_{i,enc}-\theta_{i,comp}$. The forward kinematic transformation (FKT), executed in the block 225d, of the encoder vector $\theta_E=(\theta_{1,E},\theta_{2,E},\theta_{3,E},\theta_{4,E},\theta_{5,E},\theta_{6,E})^T$ yields the encoder-defined pose $P_E$, where $P_E=(X,Y,Z,\alpha,\beta,\gamma)_E^T$. The difference between the encoder-defined pose $P_E$ and the actual pose $P_A$ is defined as the link pose error $E_l$, whereby $E_l=P_E-P_A=(\Delta X,\Delta Y,\Delta Z, \Delta\alpha,\Delta\beta,\Delta\gamma)_l^T$. In the pose compensation control 92 of the present disclosure, the position compensation value $\theta_{i,comp}$ and the position compensation vector $\theta_{comp}=(\theta_{1,comp},\theta_{2,comp},\theta_{3,comp},\theta_{4,comp},\theta_{5,comp},\theta_{6,comp})^T$ are obtained from the link pose error $E_l$.

The difference between the setting pose $P_S$ and the encoder-defined pose $P_E$ is defined as the following pose error $E_f$, whereby $E_f=P_S-P_E=(\Delta X,\Delta Y,\Delta Z,\Delta\alpha,\Delta\beta,\Delta\gamma)_f^T$. The setting pose $P_S$, the encoder-defined pose $P_E$ and the actual pose $P_A$ can be described in the reference coordinate system $\{R\}$ or in the base platform coordinate system $\{B\}$. In the presented direct pose feedback control method, the following pose error $E_f$ is a transformation of the joint following pose error vector $\Delta\theta_f$ into the reference coordinate system $\{R\}$. $\Delta\theta_f=\theta_S-\theta_{enc}=(\theta_{1,s}-\theta_{1,enc},\theta_{2,s}-\theta_{2,enc},\theta_{3,s}-\theta_{3,enc},\theta_{4,s}-\theta_{4,enc},\theta_{5,s}-\theta_{5,enc},\theta_{6,s}-\theta_{6,enc})^T$.

A major feature of the DPF control method of the present disclosure is that the existing position feedback control 91 continues to work on the joint following pose error vector $\Delta\theta_f$, which contributes to the following pose error $E_f$, while the extended pose compensation control 92 works on the link pose error $E_l$ and generates position compensation values to modify setting values in the position feedback control 91, $\theta_{comp}=(\theta_{1,comp},\theta_{2,comp},\theta_{3,comp},\theta_{4,comp},\theta_{5,comp},\theta_{6,comp})^T$, thereby achieving a fast DPF control method without dead time problem.

In the pose compensation control 92, the target pose for compensation can be chosen according to the status of the interpolator 222d, as shown in FIG. 7. When the interpolator 222d is running and new setting values for the motors are generated, the encoder-defined pose $P_E$ is selected as the target pose, and the incremental position compensation vector $\Delta\theta_{comp}$, whereby $\theta_{comp}=(\theta_{1,comp},\theta_{2,comp},\theta_{3,comp},\theta_{4,comp},\theta_{5,comp},\theta_{6,comp})^T$, can be obtained, for example, from the multiplication of the inverse Jacobian matrix $J^{-1}$ of the robotic arm 11d and the link pose error $E_l$:

$$\Delta\theta_{comp}=J^{-1}\times E_l \qquad (5)$$

When the setting pose $P_S$ of the tool is no longer changed and the setting values for the motors remain unchanged, the target pose for compensation is switched to the setting pose $P_S$, and the incremental position compensation vector $\Delta\theta_{comp}$ can be calculated from the actual pose error $E_a$ as follows:

$$\Delta\theta_{comp}=J^{-1}\times E_a \qquad (6).$$

In FIG. 7, the incremental position compensation vector $\Delta\theta_{comp}$ is solved by using the inverse Jacobian matrix $J^{-1}$, as shown in equations (5) and (6). An iteration process can also be used to obtain a more accurate result.

FIG. 8 shows a block diagram of another implement of the DPF control method according to the embodiment of FIG. 5. The inverse kinematic transformation (IKT) of the robotic arm 11*d* is executed in the block 224*d*. The equivalent actual position $\theta_{i,a}$ of each of the motors can be calculated by using the measured actual pose $P_A$, whereby the equivalent actual position vector is represented by $\theta_a$, $\theta_a=(\theta_{1,a},\theta_{2,a},\theta_{3,a},\theta_{4,a},\theta_{5,a},\theta_{6,a})^T$. Subsequently, a target pose as aforementioned is selected, for example, the encoder-defined pose $P_E$ in FIG. 8. The position compensation value $\theta_{i,comp}$ of each of the motors is subtracted from the actual position value $\theta_{i,enc}$ of each of the motors to obtain the encoder value $\theta_{i,E}$ of the encoder-defined pose $P_E$, where $\theta_{i,E}=\theta_{i,enc}-\theta_{i,comp}$. Then the equivalent actual position $\theta_{i,a}$ of each of the motors is also subtracted to obtain the new incremental position compensation value $\Delta\theta_{i,comp}$ of the i-th motor:

$$\Delta\theta_{i,comp}=\theta_{i,enc}-\theta_{i,comp}-\theta_{i,a}, i=1\ldots 6 \quad (7).$$

After the incremental position compensation vector $\Delta\theta_{comp}$ is obtained, the new position compensation value of a motor can be updated by adding the new incremental position compensation value to the currently effective one, as shown in equation 8:

$$\theta_{i,comp}[kT]=\theta_{i,comp}[kT-T]+\Delta\theta_{i,comp}[kT] \quad (8);$$

The new position compensation value $\theta_{i,comp}[kT]$ remains effective until the next update. The block 226*d* in FIGS. 7 and 8 represents the delay time to update the new position compensation value.

Please refer to FIGS. 7, 8, and 10, where the position controller 911 of the position feedback control 91 is the same as the compensation controller 921. The transfer function of the position controller 911 is $k_v$ in FIGS. 7, 8, and C(s) in FIG. 10. In FIGS. 7, 8, and 10, the position compensation value $\theta_{i,comp}$ is used to correct the setting value $\theta_{i,s}$, and the difference between the modified setting value $\theta_{i,s}$ and the actual position value $\theta_{i,enc}$ is used to generate the primary driving value $k_v\cdot(\theta_{i,s}-\theta_{i,enc})$ and the compensation driving value $k_v\cdot\theta_{i,comp}$. The velocity command $V_{cmd,i}$ for the i-th driver of the motor is the sum of the primary driving value and the compensation driving value:

$$V_{cmd,i}=k_v\cdot(\theta_{i,s}+\theta_{i,comp}-\theta_{i,enc}) \quad (9).$$

When the dead time, which is resulted from the calculation of the actual pose as mentioned above, is no problem, the joint following pose error vector $\Delta\theta_f$ can be calculated directly from the actual pose error $E_a$, $\Delta\theta_f=J^{-1}\times E_a$, whereby $\Delta\theta_f=(\theta_{1,s}-\theta_{1,a},\theta_{2,s}-\theta_{2,a},\theta_{3,s}-\theta_{3,a},\theta_{4,s}-\theta_{4,a},\theta_{5,s}-\theta_{5,a},\theta_{6,s}-\theta_{6,a})$. The position feedback control of a joint can be achieved by using for example a p-controller $k_v$. The driving value of the i-th motor is then: $V_{cmd,i}=k_v\times(\theta_{i,s}-\theta_{i,a})$. In order to avoid the problem of the dead time, in one embodiment of the DPF control method, the real-time position feedback control is performed firstly, then the pose compensation control. After the position compensation values and the compensation driving values are calculated in the pose compensation control, the compensation driving values for the motors are sent in the next interrupt cycle. In another embodiment of the DPF control method, a proportional controller is used for the compensation controller and the position controller, as shown in FIG. 10, and the new setting value is modified by the position compensation value of the previous sampling cycle. The sum of the primary driving value and the compensation driving value $V_{cmd,i}[kT]$ is given as follows:

$$V_{cmd,i}[kT]=k_v\cdot(\theta_{i,S}[kT]+\theta_{i,comp}[kT-T]-\theta_{i,enc}[kT]) \quad (10).$$

Please refer to FIG. 9, the position feedback control 91 has a position controller represented by the block 911, and its transfer function is C(s). The pose compensation control 92 has its own compensation controller, e.g., a P or PID controller, represented by the block 921, and its transfer function is CC(s). The advantage is that the existing motion control, e.g., the feed forward (FF) or cross coupling controller (CCC), remains unchanged. In one embodiment, the compensation controller 921 is a proportional controller with the gain $k_{vc}$. The position controller 911 is also a proportional controller with the gain $k_v$. Hence, the sum of the primary driving value and the compensation driving value $V_{cmd,i}$ is given as follows:

$$V_{cmd,i}=k_v\cdot(\theta_{i,s}-\theta_{i,enc})+k_{vc}\cdot\theta_{i,comp} \quad (11).$$

Since the geometric and thermal errors of a machine vary slowly, the cycling time of the pose compensation control can be much larger than that of the position feedback control. In one embodiment, the cycling time for position feedback control is 1 ms, and the cycling time for pose compensation control is 500 ms. A separation of the position feedback control and the pose compensation control in the DPF control method avoids effects of dead time in the DPF control method.

The measured actual pose of the tool contains all information about the machine. A frequency analysis of the actual pose in the controller can obtain dynamic information of the DPF controlled machine. In one embodiment, to focus on the compensation of the kinematic errors of the machine, a low-pass filter is used to filter out dynamic vibration signals of the machine structure in the position compensation value.

Figure 11:
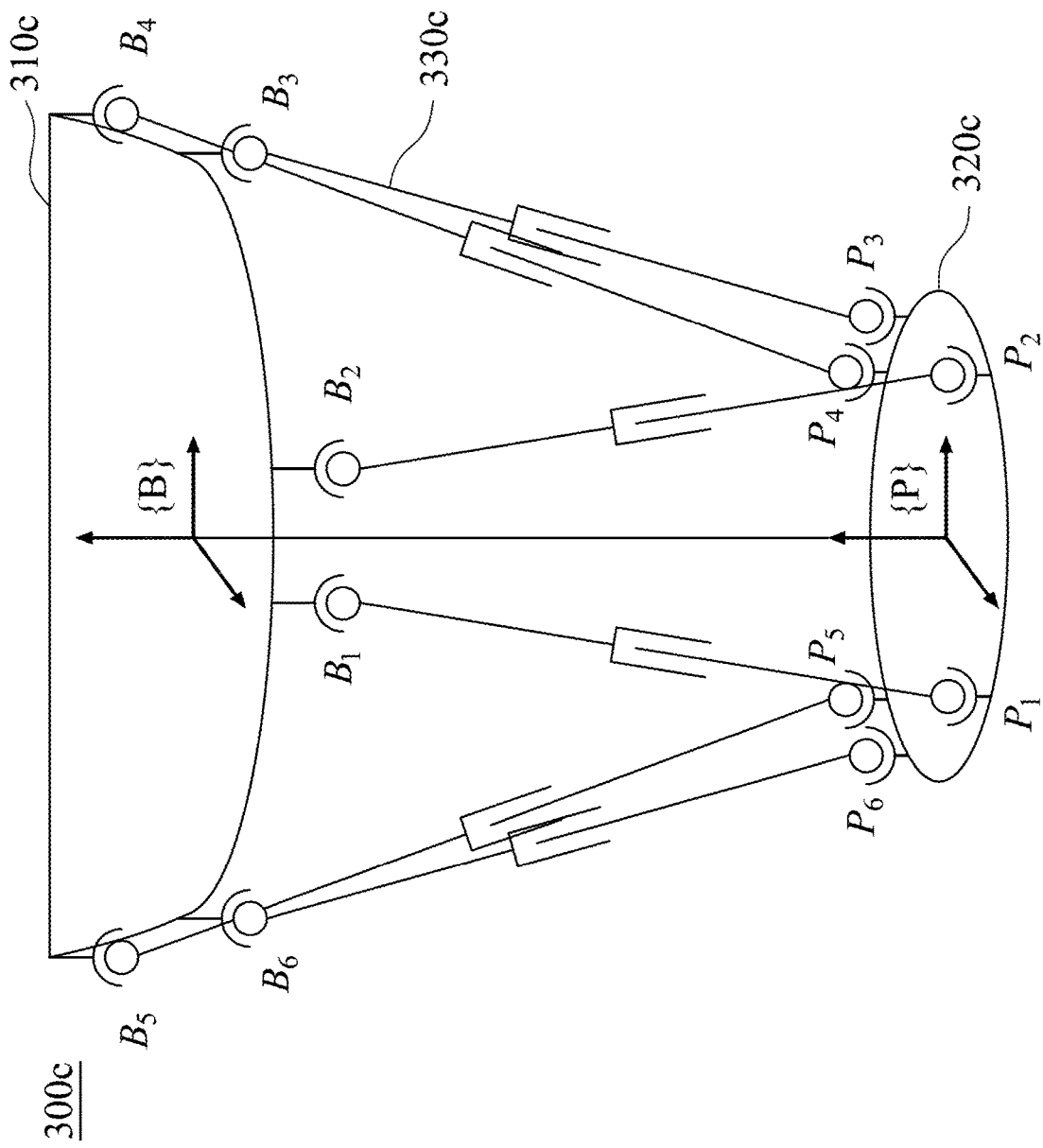
FIG. 11 shows a schematic diagram of a pose measuring mechanism according to one embodiment of the present disclosure.

FIG. 11 shows a schematic diagram of a pose measuring mechanism 300*c* according to one embodiment of the present disclosure. The base platform 310*c* is located at the upper side and the tool platform 320*c* is located at the lower side. The sockets $B_1$ to $B_6$ of the base platform 310*c* are distributed asymmetrically on the front half circle, and the sockets $P_1$ to $P_6$ of the base platform 310*c* are shifted accordingly to prevent interference between the working double ballbars 330*c* and the machine body. This ball joints configuration enables the workpiece to be loaded and unloaded from the front and the lateral side. Due to the asymmetrical arrangement of the sockets $B_1$ to $B_6$ and $P_1$ to $P_6$, the working double ballbars 330*c* can be of different measuring range.

More variations which do not deviate from the present disclosure can be made by professionals. For example, the tool platform or the base platform can be integrally designed with the machine body. Further, the gantry for the inverse arrangement of the pose measuring mechanism can be replaced by other supporting structure. The working double ballbars can have other structure and the sockets on the tool platform or the base platform can be replaced by balls, whereby the paired ball joint members on the ballbars are sockets. The whole or part of the pose measuring mechanism can be protected to avoid contamination of cutting fluid or coolant.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A direct pose feedback control method applied to a direct pose feedback controlled machine, the direct pose feedback controlled machine comprising a machine body, a controller, a plurality of motors, a pose measuring mechanism and a tool, the pose measuring mechanism disposed between a workpiece-side and a tool-side of the machine body and comprising a tool platform disposed at the tool-side, a base platform disposed at the workpiece-side, at least six working double ballbars connected to the tool platform and the base platform, a reference plate and at least one reference double ballbar disposed on the reference plate, the direct pose feedback control method comprising a pose compensation control in addition to a position feedback control, the pose compensation control comprising:
an initiation step, wherein a central distance function of the at least one reference double ballbar, a central distance function of each of the working double ballbars and a coordinate transformation between a tool platform coordinate system and a base platform coordinate system are built;
a reference system step, wherein a coordinate transformation between the base platform coordinate system and a reference coordinate system is built according to setting parameters, loaded setting values or results of an on-machine measurement;
an actual pose calculation step, wherein displacement values of the working double ballbars and the reference double ballbar and motor positions are read in real-time by the controller, thermal errors of the working double ballbars are compensated based on the displacement value of the reference double ballbar, a direct kinematic transformation of the pose measuring mechanism is performed and an actual pose and a pose error of the tool are calculated; and
a position compensation step, wherein a position compensation value for each of the motors is obtained from a target pose for compensation and the actual pose;
wherein for each of the motors, a compensation controller generates a compensation driving value according to the position compensation value, a position controller generates a primary diving value according to a setting value and an actual position value, the sum of the primary driving value and the compensation driving value is output to a corresponding driver, and the position compensation value is effective until updated by the pose compensation control.

2. The direct pose feedback control method of claim 1, wherein a cycling time of the pose compensation control is higher or equal to a cycling time of the position feedback control.

3. The direct pose feedback control method of claim 1, wherein the target pose for compensation is an encoder-defined pose or a setting pose.

4. The direct pose feedback control method of claim 1, wherein an inverse Jacobian matrix is used to obtain an incremental position compensation value of each of the motors.

5. The direct pose feedback control method of claim 1, wherein an incremental position compensation value of each of the motors is obtained by subtracting an equivalent actual position and the position compensation value from the actual position value.

6. The direct pose feedback control method of claim 1, wherein the compensation controller is a P or PID controller.

7. The direct pose feedback control method of claim 1, wherein the compensation controller and the position controller are the same.

8. The direct pose feedback control method of claim 1, wherein a low-pass filter is used to filter out vibration signals in the position compensation value.

9. The direct pose feedback control method of claim 1, wherein, in the initiation step, at least one of the motors is driven to allow each of the working double ballbars to pass a reference mark on an optical scale and to initiate the central distance function of each of the working double ballbars.

10. The direct pose feedback control method of claim 1, wherein the on-machine measurement comprises:
positioning at least two of the motors one by one;
using the pose measuring mechanism to identify an orientation and a location of a driven axis;
building the reference coordinate system based on identified axis vectors, and
obtaining the coordinate transformation between the base platform coordinate system and the reference coordinate system.

11. The direct pose feedback control method of claim 1, wherein, in the position compensation step, an iteration process is performed to obtain an incremental position compensation value of each of the motors.

12. The direct pose feedback control method of claim 1, wherein, in the actual pose calculation step, thermal errors of sockets or ball joints on the tool platform and the base platform are further compensated based on the measured displacement value of the reference double ballbar.

13. The direct pose feedback control method of claim 1, wherein the displacement values of the working double ballbars are latched by a trigger signal and are used to calculate a position of a probe ball.

14. The direct pose feedback control method of claim 1, wherein the direct pose feedback controlled machine further comprises a gantry or a supporting structure to fix the base platform, and, in the actual pose calculation step, a thermal error of the gantry or the supporting structure is compensated based on the measured displacement value of the reference double ballbar or measured temperatures of an environment and the gantry or the supporting structure.

15. The direct pose feedback control method of claim 1, wherein in the actual pose calculation step, a thermal error of a length of the tool is compensated based on the displacement value of the reference double ballbar.

16. The direct pose feedback control method of claim 1, wherein a frequency analysis of the actual pose of the tool is performed in the controller to obtain dynamic information of the direct pose feedback controlled machine.

17. A direct pose feedback controlled machine, comprising:
a machine body and a tool;
a plurality of motors disposed on the machine body;
a controller configured to drive the tool to move relative to a workpiece; and
a pose measuring mechanism disposed between a workpiece-side and a tool-side of the machine body, comprising:
a tool platform disposed at the tool-side;
a base platform disposed at the workpiece-side;

at least six working double ballbars connected to the tool platform and the base platform via ball joints;

a reference plate comprising at least two three-point support sockets; and at least one reference double ballbar disposed on the three-point support sockets;

wherein the controller compensates thermal errors of the pose measuring mechanism based on displacement value of the at least one reference double ballbar, uses the pose measuring mechanism to obtain an actual pose of the tool and a tool pose error, and generates a position compensation value and a compensation driving value for each of the motors to eliminate the tool pose error.

18. The direct pose feedback controlled machine of claim 17, further comprising:

a main spindle block disposed on the machine body; and a main spindle fixed on the main spindle block;

wherein the tool platform is secured on the main spindle block or the main spindle.

19. The direct pose feedback controlled machine of claim 17, wherein the direct pose feedback controlled machine is a multi-axis machine tool, a multi-joint robotic arm or a parallel kinematics machine.

20. The direct pose feedback controlled machine of claim 17, wherein the tool is a cutting tool, a measuring probe, a touch probe, a confocal sensor, a displacement measuring laser or an optical measuring device.

21. The direct pose feedback controlled machine of claim 17, wherein the tool provides a trigger signal to latch the displacement value of each of the working double ballbars simultaneously.

22. The direct pose feedback controlled machine of claim 17, further comprising:

a reference ball disposed on the base platform or a worktable.

23. The direct pose feedback controlled machine of claim 17, further comprising:

a tool length measuring device disposed on the base platform or a worktable.

24. The direct pose feedback controlled machine of claim 17, wherein the ball joints of the base platform or the tool platform are arranged asymmetrically.

25. The direct pose feedback controlled machine of claim 17, wherein the ball joints of the base platform and the tool platform are secured on a material having a coefficient of thermal expansion smaller than 2 ppm/° C.

26. The direct pose feedback controlled machine of claim 17, further comprising a gantry or a supporting structure to fix the base platform so that the tool is not surrounded by the working double ballbars.

27. The direct pose feedback controlled machine of claim 17, wherein the controller comprises a real-time communication network to receive and send control information.

28. The direct pose feedback controlled machine of claim 27, wherein the real-time communication network is EtherCAT.

29. The direct pose feedback controlled machine of claim 17, wherein a displacement sensor of each of the working double ballbars and the reference double ballbar is a laser interferometer, an optical scale or a magnetic scale.

* * * * *